: 
(12) United States Patent
Zhang et al.

(10) Patent No.: US 9,461,496 B1
(45) Date of Patent: Oct. 4, 2016

(54) METHOD AND SYSTEM FOR RECHARGING A SOLID STATE BATTERY

(75) Inventors: Xiangchun Zhang, Ann Arbor, MI (US); Steve Buckingham, Ypsilanti, MI (US); Yen-Hung Chen, Ann Arbor, MI (US); Myoungdo Chung, Ann Arbor, MI (US); Marc Langlois, Ann Arbor, MI (US); HyonCheol Kim, Ann Arbor, MI (US); Ann Marie Sastry, Ann Arbor, MI (US); Chia-Wei Wang, Ypsilanti, MI (US)

(73) Assignee: Sakti3, Inc., Ann Arbor, MI (US)

( * ) Notice: Subject to any disclaimer, the term of this patent is extended or adjusted under 35 U.S.C. 154(b) by 1133 days.

(21) Appl. No.: 13/437,686

(22) Filed: Apr. 2, 2012

(51) Int. Cl.
*H02J 7/04* (2006.01)
*H02J 7/00* (2006.01)
*H02J 7/16* (2006.01)
*H02J 7/06* (2006.01)

(52) U.S. Cl.
CPC ...................................... *H02J 7/007* (2013.01)

(58) Field of Classification Search
CPC ...................................... H02J 7/007
USPC ........ 320/160, 150, 152, 153, 162, 163, 164
See application file for complete search history.

(56) References Cited

U.S. PATENT DOCUMENTS

| | | | | |
|---|---|---|---|---|
| 6,275,006 B1 * | 8/2001 | Koike | ................... | H02J 7/0073 320/125 |
| 7,187,156 B2 * | 3/2007 | Nakasho | ................ | H02J 7/047 320/106 |
| 7,528,574 B1 * | 5/2009 | Adkins | ................ | H01M 10/44 320/128 |
| 7,834,591 B2 * | 11/2010 | Hussain | ................ | H01M 10/44 320/128 |
| 2010/0176768 A1 * | 7/2010 | Kimura et al. | ................ | 320/152 |

\* cited by examiner

*Primary Examiner* — Richard V Muralidar
(74) *Attorney, Agent, or Firm* — Morrison & Foerster LLP

(57) ABSTRACT

A method and system for recharging a solid state battery device. The method can include providing the solid state battery in a fully or partially discharged state. The solid state battery can be coupled to a pair of electrodes. An energy source coupled to the electrodes can be used to supply energy to the solid state battery. This supply of energy can use a first constant current recharge process followed by a constant voltage recharge process. This supply of energy can cause an increase of an energy level of the solid state battery to the maximum energy level within a predetermined amount of time. The predetermined amount of time can be determined as being less than a time period associated with recharging the solid state battery using solely a constant current recharge process.

16 Claims, 7 Drawing Sheets

| | Discharge Profile | Recharge Profile | Discharge Energy density for Cycle # 1 | Discharge Energy density for Cycle # 2 |
|---|---|---|---|---|
| Profile 1 | C/10 constant current till 1.5 V | C/10 constant current till 3.5 V, hold at 3.5 V for 1 hour | 1048 Wh/l (100%) | 962 Wh/l (91.8%) |
| Profile 4 | C/10 constant current till 1.5 V | Constant voltage 3.5 V for 11 hours | 1048 Wh/l (100%) | 998 Wh/l (95.2%) |
| Profile 2 | C/10 constant current till 1.5 V | C/10 constant current till 3.6 V, hold at 3.6 V for 1 hour | 1048 Wh/l (100%) | 1015 Wh/l (96.9%) |
| Profile 3 | C/10 constant current till 1.5 V | C/10 constant current till 3.65 V, hold at 3.65 V for 1 hour | 1048 Wh/l (100%) | 1032 Wh/l (98.5%) |
| Profile 6 | C/10 constant current till 1.5 V | Constant voltage 3.7 V for 3 hours | 1048 Wh/l (100%) | 1033 Wh/l (98.6%) |
| Profile 6 | C/10 constant current till 1.5 V | Constant voltage 3.65 V for 3 hours | 1048 Wh/l (100%) | 1046 Wh/l (99.8%) |
| Profile 5 | C/10 constant current till 1.5 V | Constant voltage 3.65 V for 11 hours | 1048 Wh/l (100%) | 1048 Wh/l (100%) |

FIGURE 6

METHOD AND SYSTEM FOR RECHARGING A SOLID STATE BATTERY

BACKGROUND OF THE INVENTION

This present invention relates to manufacture of electrochemical cells. More particularly, the present invention provides a method and system for recharging a solid state battery for related applications. Merely by way of example, the invention has been provided for the application of lithium based cells, but it would be recognized that battery cells of other materials such as zinc, silver, copper and nickel could be used in the same or like fashion. Additionally, such batteries can be used for a variety of applications such as portable electronics (cell phones, personal digital assistants, music players, video cameras, and the like), power tools, power supplies for military use (communications, lighting, imaging and the like), power supplies for aerospace applications (power for satellites), and power supplies for vehicle applications (hybrid electric vehicles, plug-in hybrid electric vehicles, and fully electric vehicles). The design of such batteries is also applicable to cases in which the battery is not the only power supply in the system, and additional power is provided by a fuel cell, other battery, IC engine or other combustion device, capacitor, solar cell, etc.

Commercial lithium ion batteries contain organic solvent-based liquid electrolytes, consisting of three main components: the lithium salt, the organic solvent, and the additives. These organic solvent-based liquid electrolytes are detrimental to battery's performance and safety due to the solvents' low boiling and flash points and auto-ignition temperatures, and the salt's low thermal stability and sensitivity to hydrolysis. For these reasons, lithium ion batteries using organic solvent-based liquid electrolytes have to be cycled under very tightly controlled conditions to limit the voltage ranges, limit the discharge/charge current, and lower the battery temperature (less than 60° C.). These stringent conditions prominently affect the design of charge methods, in particular, for these batteries. The desired objectives for recharging a battery should be maximizing energy and/or capacity utilization, maximizing energy efficiency and minimizing charge time. However, the priority of these desirable objectives is usually overtaken by improving safety and prolonging cycle life in designing charge methods for lithium ion batteries just because of organic solvent-based liquid electrolytes. Specifically, these organic solvent-based liquid electrolytes require the recharge method to use lower end-of-charge voltage limits, lower charge current and/or rates, and narrower state-of-charge ranges. Because of the voltage and state-of-charge limiting, not all the energy and/or capacity allowed by the battery electrochemistry are fully utilized.

For example, the Chevrolet Volt tightly control and buffer the on-board battery usage so that the battery only operates within a state-of-charge window of 65 percent. In other words, 5.6 kWh energy out of the designed 16 kWh total energy of the battery pack is not used at all. The voltage and charge rate limiting also adds to the sophistication and complexity of battery charging algorithms and systems. These problems are common for all the batteries using organic solvent-based liquid electrolytes for applications such as consumer electronics, grid storage, plug-in hybrid electric vehicles and battery electric vehicles.

From the above, it is seen that techniques for improving the charging methods and systems relating to solid state cells are highly desirable.

BRIEF SUMMARY OF THE INVENTION

This present invention relates to manufacture of electrochemical cells. More particularly, the present invention provides a method and system for recharging a solid state battery for related applications. Merely by way of example, the invention has been provided for the application of lithium based cells, but it would be recognized that battery cells of other materials such as zinc, silver, copper and nickel could be used in the same or like fashion. Additionally, such batteries can be used for a variety of applications such as portable electronics (cell phones, personal digital assistants, music players, video cameras, and the like), power tools, power supplies for military use (communications, lighting, imaging and the like), power supplies for aerospace applications (power for satellites), and power supplies for vehicle applications (hybrid electric vehicles, plug-in hybrid electric vehicles, and fully electric vehicles). The design of such batteries is also applicable to cases in which the battery is not the only power supply in the system, and additional power is provided by a fuel cell, other battery, IC engine or other combustion device, capacitor, solar cell, etc.

In an embodiment, the present invention includes a method for charging a solid state battery cells. These solid state battery cells can be characterized by a maximum energy level, which can be an upper energy limit of the solid state battery. The method can include providing the solid state battery in a fully or partially discharged state. The solid state battery can be coupled to a pair of electrodes (coupling a positive potential and a negative potential of the solid state battery). An energy source coupled to the electrodes can be used to supply energy to the solid state battery. This supply of energy can use a first constant current recharge process followed by a constant voltage recharge process (constant current constant voltage recharge process). Alternatively, a constant voltage recharge process can be used. This supply of energy can cause an increase of an energy level of the solid state battery to the maximum energy level within a predetermined amount of time. The predetermined amount of time can be determined as being less than a time period associated with recharging the solid state battery using solely a constant current recharge process. Through these process steps, a temperature of −20 Degrees Celsius to 160 Degrees Celsius during the recharging process.

In a specific embodiment, the constant current constant voltage recharge process can include recharging the solid state battery with a constant current until a voltage of the solid state battery reaches an upper voltage limit and recharging the solid state battery with a constant voltage with a voltage value maintained at the upper voltage limit until a time duration is reached or a state of charge is reached. The constant current value can be converted from a C rate of the solid state battery, the C rate being selected to minimize the time period. Also, the upper voltage limit is selected to a maximum open circuit potential of a cathode material against an anode material and a wide stable operational voltage region of a solid electrolyte material in the solid state battery cell, the upper voltage limit being selected to minimize the predetermined time and maximizing energy restored to the solid state battery. The predetermined time can be determined to achieve an amount of energy restored to the solid state battery, the amount of energy being substantially within a vicinity of a theoretical upper limit for the electrochemical cells which comprise the battery, of an operational voltage range from about 0.1 Volt to 5.5 Volts of the solid state battery using a solid electrolyte. In a specific embodiment, the solid state battery is provided for one or more applications including at least consumer electronics (including smartphones, cameras, tablets and laptop computers), grid storage for wind energy, hybrid electrical vehicles, and others where recharge time is reduced while maximizing energy efficiency is not achieved.

In a specific embodiment, the constant voltage recharge process can include recharging the solid state battery with a constant voltage at a value and maintaining the constant voltage recharge process until a time duration is reached or a state of charge is reached. The constant voltage value can be selected according to an maximum open circuit potential of a cathode material against an anode material and a wide stable operational voltage range from about 0.1 Volts to 5.5 Volts in the solid state battery cell, constant voltage value being selected to minimize a recharge time and maximizing an energy restored to the solid state battery. Of course, there can be other variations, modifications, and alternatives.

In a specific embodiment, the solid state battery device can be characterized by a theoretical energy capacity with an operating temperature range from about −20 to about 160 Degrees Celsius, and an operating voltage range from about 0.1 Volt to about 5.5 Volts for a solid state electrochemical battery cell. The solid state battery device can be a battery cell, a battery module consisting of a plurality of battery cells, or a battery pack consisting of a plurality of battery modules. Those of ordinary skill in the art will recognize other variations, modifications, and alternatives.

In a specific embodiment, the controller can include one or more computer codes in a computer readable memory device or devices. These computer codes can be directed to the transmission of instructions to the energy source to turn of the energy source when a state of charge of the solid state battery is within a vicinity of the theoretical energy capacity. The controller can also be configured to receive one or more inputs from the voltage sensor, the current sensor, and the temperature sensor, and be configured to transmit a control signal to the energy source.

In various embodiments, the controller can be configured to direct the charging source to apply a constant charging current to the battery until the monitored voltage reaches an upper limit and/or direct the charging source to apply a constant charging voltage to the battery until the state of charge of the solid state battery reaches a determined value. The controller can be further configured to switch a charging mode of the energy source from a constant current process to a constant voltage process, and vice versa. Also, the controller can be further configured to determine a state of charge of the solid state battery by using at least the inputs comprising the measured voltage from the voltage sensor and the measured current from the current sensor; and the controller is programmed to execute one or more lines of computer code stored on a computer readable memory, the computer codes are directed to one or more processes including at least: coulomb counting, voltage translation, and voltage look-up, and/or other processes comprising at least: fuzzy logic, neural networks, extended Kalman filter, unscented transform based correction-prediction filter, and other recursive self-learning estimation methods, associated with battery models comprising at least equivalent circuit models multiphysics model, and other reduced-order models. Of course, there can be other variations, modifications, and alternatives.

Benefits are achieved over conventional techniques. Depending upon the specific embodiment, one or more of these benefits may be achieved. Embodiments of the present invention can include the use methods and systems to make solid state cells lead by computation aided engineering and design. Issues such as off gassing, cathode dissolution, and electrolyte solvent/salt decomposition can be mitigated and even eliminated by selecting only solid state processing. Higher throughput of cells can be conducted through simulations, which extend design of solid state battery cells to novel areas. These can be used to determine improved and novel recharge protocols that maximize energy density and efficiency, while minimizing recharge time. Of course, there can be other variations, modifications, and alternatives.

The present invention achieves these benefits and others in the context of known process technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

FIG. 6 is a table comparing charge data from computer simulations of recharging solid state batteries according to an embodiment of the present invention.

DETAILED DESCRIPTION OF THE INVENTION

Figure 1:
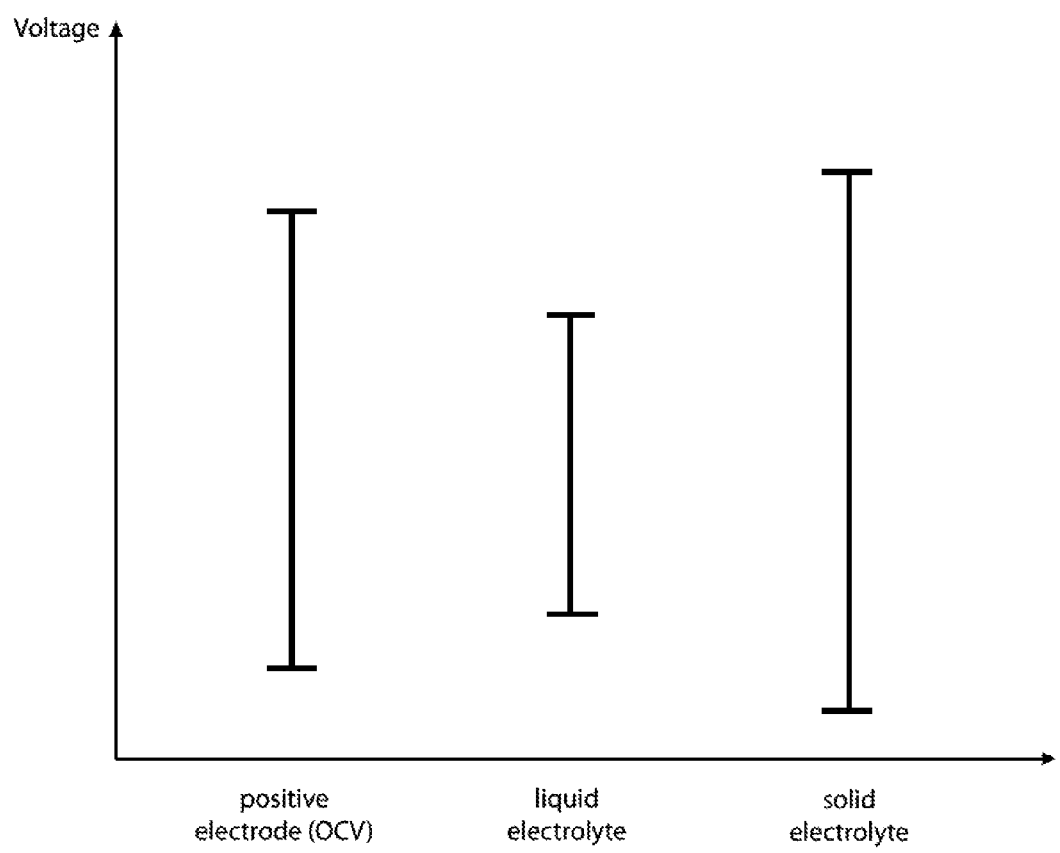
FIG. 1 is a simplified diagram of comparisons of voltage operation ranges between battery devices of different types and materials according to an embodiment of the present invention.

This present invention relates to manufacture of electrochemical cells. More particularly, the present invention provides a method and system for recharging a solid state battery for related applications. Merely by way of example, the invention has been provided for the application of lithium based cells, but it would be recognized that battery cells of other materials such as zinc, silver, copper and nickel could be used in the same or like fashion. Additionally, such batteries can be used for a variety of applications such as portable electronics (cell phones, personal digital assistants, music players, video cameras, and the like), power tools, power supplies for military use (communications, lighting, imaging and the like), power supplies for aerospace applications (power for satellites), and power supplies for vehicle applications (hybrid electric vehicles, plug-in hybrid electric vehicles, and fully electric vehicles). The design of such batteries is also applicable to cases in which the battery is not the only power supply in the system, and additional power is provided by a fuel cell, other battery, IC engine or other combustion device, capacitor, solar cell, etc.

To achieve high voltage and energy output from lithium ion batteries, anode and cathode materials with potentials (in the battery charged state) of about 0.0-0.2 V (vs. Li/Li$^+$) and 3.0-4.5 V (vs. Li/Li$^+$), respectively, are used. The current state-of-the-art organic solvent-based liquid electrolytes have an operating potential range of less than 4.3 V vs. Li/Li$^+$. The end-of-charge voltage of battery has to be limited due to the oxidative decomposition reactions of carbonate-based non-aqueous electrolytes. These decomposition reactions cause gas generation. Battery swelling due to internal gas formation in cells can result in severe degradation of battery performance. Evolved gas reduces the interfacial area between active material and electrolyte, and thus hinders the electrochemical reactions at the solid electrolyte interphase (SEI). Also, the pressure buildup due to gas generation results in mechanical stress inside the electrodes, which has been implicated in local fractures in the electrodes.

The end-of-charge voltage of battery has to be limited because of possible side reactions between cathode material dissolution in electrolyte. For example, an experiment using rotating ring-disk electrode techniques has demonstrated that the dissolution of Mn from spinel $LiMn_2O_4$ occurs during charge/discharge cycling, especially in a charged state (at >4.1 V) and in a discharged state (at <3.1 V). Spinel particles begin dissolving, losing their intimate contact with conductive additive particles and increasing contact resistance. Electrode reaction resistance is increased due to the presence of dissolved $Mn^{2+}$ ions in the electrolyte. The dissolved $Mn^{2+}$ ions may be transported through the electrolyte to be deposited on the anode side. This phenomenon can deplete the anode by the reduction of Mn, which would oxidize Li in the anode. This would also accelerate the capacity fade of lithium ion batteries.

The charge current and/or rate for lithium ion batteries containing organic solvent-based liquid electrolytes has to be limited to avoid high battery temperatures because these electrolytes are thermally unstable. The most widely used electrolyte for lithium ion batteries is lithium hexafluorophosphate ($LiPF_6$) in a mixture of organic carbonate solvents. However, $LiPF_6$-based electrolytes have poor stability at elevated temperatures (60° C.). $LiPF_6$ is unstable at elevated temperature with lithiated graphite anodes and delithiated transition metal oxide cathodes. $LiPF_6$ also reacts with water, present in trace amounts in Li-ion batteries, to generate hydrofluoric acid (HF). HF dissolves transition metal ions from the cathode, which leads to capacity fading, especially at elevated temperature. Thus, the elevated temperature results in loss of performance in lithium-ion batteries due factors, including the continued reaction of the electrolyte with the anode or compounds present in the anode solid electrolyte interface (SEI), which results in growth of the SEI, decomposition of the electrolyte on the surface of cathode particles to generate resistive films, and bulk electrolyte decomposition.

The charge current and/or rate for lithium ion batteries containing porous electrodes consisting of anode/cathode materials in particulate form has to be tightly constrained because fast charge rate is correlated to higher stress due to lithium intercalation and de-intercalation. For electrode made of particles, fast charge rates have been correlated to higher intercalation-induced stresses and possible fracture of particles, which degrades battery performance in terms of energy and capacity over cycles. A study using scanning electron microscopy showed fracture of $LiMn_2O_4$ powders induced by a dimensional mismatch in the particles after cyclic voltammetric tests at high scan rates. Theoretical modeling work also showed that higher cycling rates yield higher intercalation-induced stresses. Electrode materials in particulate form are more prone to high stresses and develop mechanical fracture than those in other configurations such as thin films and nanowires.

The consequences for the stringent voltage and current/rate limiting during charge are under-utilized energy and capacity, slower charge rates, and sophisticated charge algorithm and system design. Table 1 is an example of battery pack energy utilization for plug-in electric vehicles and battery electric vehicles. It is shown that only 65% to 89% of the total energy specified for the whole battery pack is actually used due to voltage and state of charge range limiting.

TABLE 1

Energy, utilization of battery packs used in (plug-in hybrid) electric vehicles

| EV/PHEV Model | Li-ion Battery Manufacturer | Electrolyte Type | Battery Pack Total Energy | Percentage of Usable Energy due to Voltage Limitation | Energy Unused |
|---|---|---|---|---|---|
| Chevy Volt | LG CHEM | Liquid; carbonate solution containing $LiPF_6$ | 16 kWh | 65% | 5.6 kWh |
| Nissan Leaf | Automotive Energy Supply Corporation | Liquid | 24 kWh | 80% | 4.8 kWh |
| Tesla Roadster | — | Liquid | 53 kWh | 89% | 5.83 kWh |

Very sophisticated control algorithms have been developed to closely monitor and manage battery charging processes. In order to strictly control voltage and state of charge limits, algorithms, such as neural network and Kalman filter based estimation, were developed to determine the state of charge and remaining capacity. The complexity of the control algorithms is further increased by the near-flat discharge curves and capacity degradation over cycles for lithium ion batteries containing organic solvent-based liquid electrolytes. This increases the cost and robustness of battery chargers dramatically.

Sophisticated and complex hardware and components have also to be implemented in battery packs, especially those used for automotive vehicles to closely monitor and control battery operating and environmental temperature and monitor and balance cell state-of-charge. For example, the battery pack used in Tesla Roadster, an electric vehicle by Tesla Motors, has an aluminum battery enclosure. The battery pack is comprised of 11 battery modules, a main control and logic PCB (printed circuit board), and a 12V DC-DC power supply. Each of the 11 modules carries a monitoring PCB (with its own microprocessor) that communicates with the rest of the vehicle microcontrollers, broadcasting the voltage and temperature measurements of its module over a standard CAN bus, a robust automotive communication protocol. Each of the thousands of cells has two fuses (one each for the cell's anode and cathode). In addition to cell fuses, each of the 11 battery modules has its own main fuse that guards against a short circuit across the complete module. To keep the battery cell temperature in control, the thermal management system uses tubes and manifold to circulate cooling fluid (a 50/50 mix of water and glycol) throughout the pack via sealed fluid paths. The multiple microprocessors within the Energy Storage System (ESS) communicate via a CAN bus. During normal vehicle operation and storage, the battery logic board communicates with the vehicle to initiate battery cooling, report state of charge, and signal battery faults.

In another example, the battery pack used in Chevrolet Volt, a plug-in electric vehicle by General Motors, is climate-controlled via an exclusive active liquid control system that continually monitors and maintains the battery pack temperature for optimum performance and durability. Circulating liquid (consisting of coolant and distilled water) passes through a series of internal heat exchangers in the battery modules. The Volt battery can be warmed or cooled. In cold weather, the battery is preheated during charging to provide full power capability. In hot weather, the most challenging environment for a battery, the Volt's battery can be chilled during charging. It is designed to provide reliable operation, when plugged in, at temperatures as low as −13 degrees Fahrenheit (−25° C.) and as high as 122 degrees Fahrenheit (+50° C.). The system is programmed to stay within 3.6° F. (2° C.) of the battery pack's optimal temperature, which depending on usage conditions falls in a range between 50 and 85° F. (10 and 30° C.). Three different systems regulate the Volt's coolant temperature. An electric heater located at the battery pack's inlet warms the coolant when the Volt is plugged in and charging during cold weather. During normal vehicle operating conditions, coolant passes through a heat exchanger. And when the battery temperature is excessively high, a chiller in the air-conditioning circuit dissipates battery heat. The Volt's battery management system continuously monitors the battery in real-time for optimum operations. More than 500 diagnostics run at 10 times per second, keeping track of the Volt's battery pack. 85 percent of the diagnostics ensure the battery pack is operating safely, while the remaining 15 percent keep track of battery performance and life.

In a further example of Leaf, an electric vehicle by Nissan Motors, even though it does not use active thermal management for its battery pack, where the temperature of the pack is controlled by an HVAC system, it uses an internal fan that circulates the air within the sealed pack to evenly distribute the heat, which escapes by passive radiation through the pack's external case.

The aforementioned issues, complexities and consequences related to organic solvent-based liquid electrolytes are overcome by substituting liquid electrolytes with solid ceramic electrolytes. Solid ceramic electrolytes are thermally stable without concerns of decomposition and gas evolution at elevated temperature. Solid ceramic electrolytes have wider operational voltage ranges. For example, lithium phosphorus oxynitride (LiPON), a solid ceramic electrolyte shows excellent stable potential range from 0 to 5.5V with respect to a Li electrode. This upper voltage limit value of 5.5 V is satisfyingly above typical open circuit potential of cathode materials used in lithium ion batteries. Therefore, lithium ion batteries using solid ceramic electrolyte are less prone to overcharge than batteries using organic solvent-based liquid electrolytes. Furthermore, the high elastic moduli of solid ceramic electrolytes enable them to be used in batteries of thin film configuration, which reduces the concern of larger stress concentration at higher charge rates. Therefore, solid ceramic electrolyte equipped lithium ion batteries can be recharged at wider voltage limits and faster rates. Solid state lithium ion batteries using ceramic electrolyte show less performance degradation over cycles. The discharge curves of Sakti3 batteries show adequate degree of slop which makes state of charge estimation easier. Less capacity degradation over cycles and easier state-of-charge estimation make Sakti3 battery control system more robust, more efficient and more cost competitive. The charge method can be actually designed, with more freedom, to maximize energy and/or capacity utilization, maximize energy efficiency and minimize charge time, which is the purpose of the current invention.

There are two typical categories of recharge strategies, (1) constant current followed by a constant voltage and (2) constant voltage throughout the recharge. In the constant current constant voltage approach, the batteries are first recharged with a constant current until an upper voltage limit is reached. The battery is then recharged by using a constant voltage taking the same value as the upper voltage limit. This constant voltage is maintained for a certain amount of time until the desired capacity is restored. In the constant voltage approach, the batteries are recharged using a constant voltage until the desired capacity is restored. In both cases, the capacity is difficult to measure practically. Therefore, the constant voltage phase duration is determined a priori to make sure the desired capacity is restored during this period of time. In constant current constant voltage recharge, tunable variables are (1) recharge current in terms of C rate at the constant current phase and (2) upper voltage limits where the constant current recharge phase is terminated and where the voltage is held at during constant voltage phase. In the constant voltage recharge, the tunable variable is the recharge voltage maintained throughout the process.

Example 1

Illustration of the Wider Stable Operational Voltage Range of Solid Electrolyte Used in Solid State Batteries FIG. 1 is a simplified diagram of comparisons of voltage operation ranges between battery devices of different types and materials according to an embodiment of the present invention. This diagram is merely an illustration and should not unduly limit the scope of the claims herein. As shown, the advantage of solid state lithium ion batteries which use solid ceramic electrolytes over conventional lithium ion batteries containing organic solvent-based liquid electrolytes is clear. For conventional lithium ion batteries with liquid electrolyte, the recharge upper voltage limit has to be set to a value lower than the maximum cathode open circuit potential because the stable operational voltage range of the electrolyte is smaller than the cathode open circuit potential. The state-of-charge of the battery has to be closely monitored and throttled to ensure the stability of organic solvent-based liquid electrolytes. The available energy stored in the electrode is not fully utilized.

Solid electrolyte has wider voltage operational range which covers the open circuit potential of positive electrode (cathode) materials. Therefore, solid state batteries with solid electrolyte has a wider voltage operational range for a given cathode material. In other words, the voltage ranges for discharge and recharge of solid state batteries are wider. Solid state batteries utilize more of the available energy stored in electrode materials.

For conventional lithium ion batteries with liquid electrolyte, the recharge upper voltage limit has to be set to a value lower than the maximum cathode open circuit potential because the stable operational voltage range of the electrolyte is smaller than the cathode open circuit potential. The state-of-charge of the battery has to be closely monitored and throttled to ensure the stability of organic solvent-based liquid electrolytes. The available energy stored in the electrode is not fully utilized.

Solid electrolyte has wider voltage operational range which covers the open circuit potential of positive electrode (cathode) materials. Therefore, solid state batteries with solid electrolyte has a wider voltage operational range for a given cathode material. In other words, the voltage ranges for discharge and recharge of solid state batteries are wider. Solid state batteries utilize more of the available energy stored in electrode materials.

Figure 2:
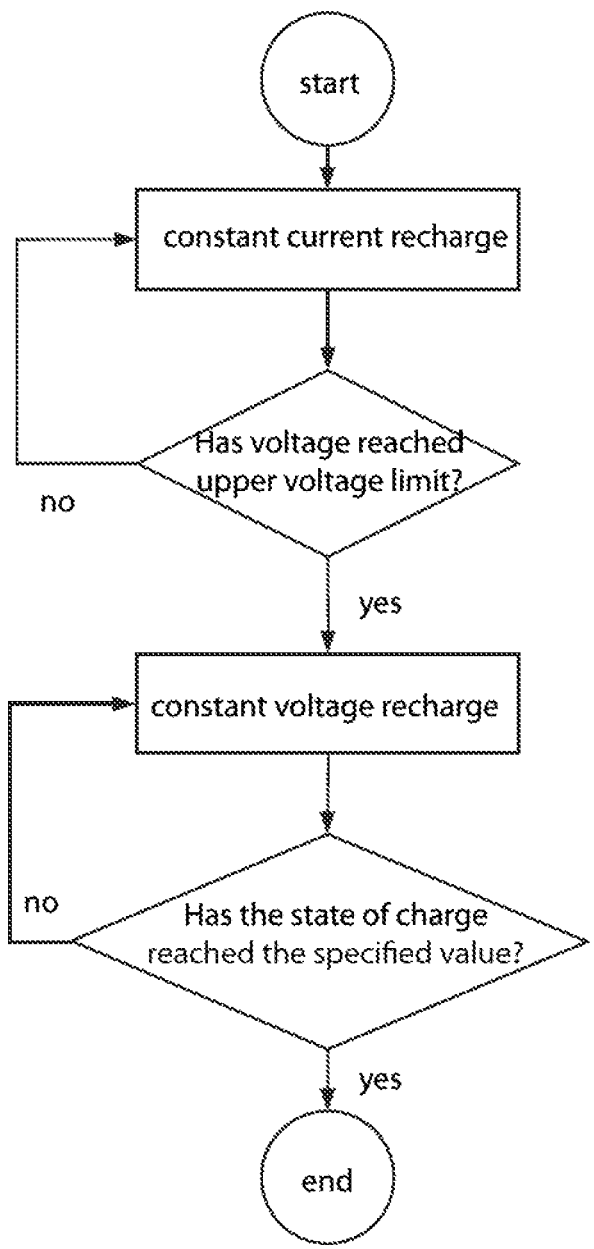
FIG. 2 a simplified flow diagram of a method for recharging a solid state battery according to an embodiment of the present invention.
Figure 3:
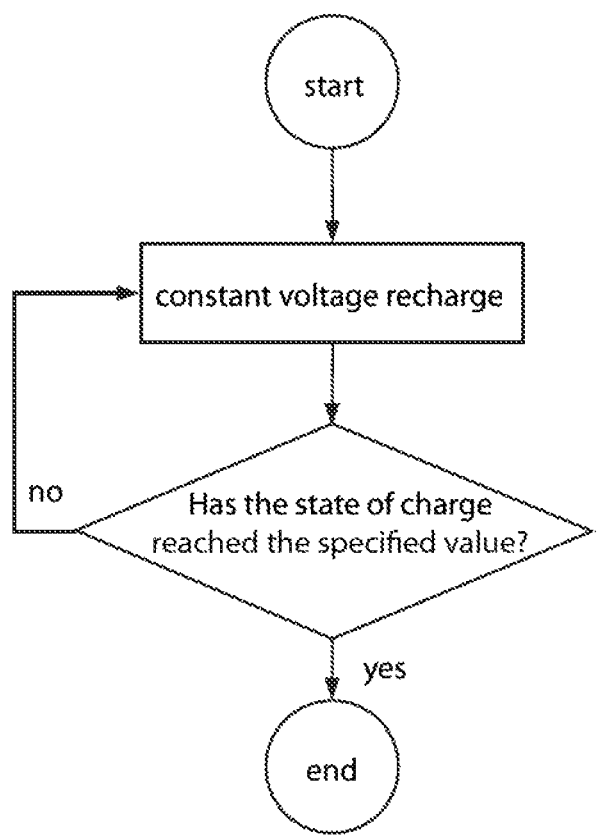
FIG. 3 is a simplified flow diagram of a method for recharging a solid state battery according to an embodiment of the present invention.

FIGS. 2 and 3 are simplified flow diagrams of a method for recharging solid state batteries according to an embodiment of the present invention. This diagram is merely an illustration and should not unduly limit the scope of the claims herein.

In an embodiment, the present invention includes a method for charging a solid state battery cells. These solid state battery cells can be characterized by a maximum energy level, which can be an upper energy limit of the solid state battery. The method can include providing the solid state battery in a fully or partially discharged state. The solid state battery can be coupled to a pair of electrodes (coupling a positive potential and a negative potential of the solid state battery). An energy source coupled to the electrodes can be used to supply energy to the solid state battery. This supply of energy can use a first constant current recharge process followed by a constant voltage recharge process (constant current constant voltage recharge process). Alternatively, a constant voltage recharge process can be used. This supply of energy can cause an increase of an energy level of the solid state battery to the maximum energy level within a predetermined amount of time. The predetermined amount of time can be determined as being less than a time period associated with recharging the solid state battery using solely a constant current recharge process. Through these process steps, a temperature of −20 Degrees Celsius to 160 Degrees Celsius during the recharging process.

In a specific embodiment, the constant current constant voltage recharge process can include recharging the solid state battery with a constant current until a voltage of the solid state battery reaches an upper voltage limit and recharging the solid state battery with a constant voltage with a voltage value maintained at the upper voltage limit until a time duration is reached or a state of charge is reached. The constant current value can be converted from a C rate of the solid state battery, the C rate being selected to minimize the time period. Also, the upper voltage limit is selected to a maximum open circuit potential of a cathode material against an anode material and a wide stable operational voltage region of a solid electrolyte material in the solid state battery cell, the upper voltage limit being selected to minimize the predetermined time and maximizing energy restored to the solid state battery. The predetermined time can be determined to achieve an amount of energy restored to the solid state battery, the amount of energy being substantially within a vicinity of a theoretical upper limit for the electrochemical cells which comprise the battery, of an operational voltage range from about 0.1 Volt to 5.5 Volts of the solid state battery using a solid electrolyte. In a specific embodiment, the solid state battery is provided for one or more applications including at least consumer electronics (including smartphones, cameras, tablets and laptop computers), grid storage for wind energy, hybrid electrical vehicles, and others where recharge time is reduced while maximizing energy efficiency is not achieved.

In a specific embodiment, the constant voltage recharge process can include recharging the solid state battery with a constant voltage at a value and maintaining the constant voltage recharge process until a time duration is reached or a state of charge is reached. The constant voltage value can be selected according to an maximum open circuit potential of a cathode material against an anode material and a wide stable operational voltage range from about 0.1 Volts to 5.5 Volts in the solid state battery cell, constant voltage value being selected to minimize a recharge time and maximizing an energy restored to the solid state battery. Of course, there can be other variations, modifications, and alternatives.

In an embodiment, the present invention can include a method of recharging solid state battery cells, the solid state battery characterized by a maximum energy level, the maximum energy level being an upper energy limit of the solid state battery. The method can include providing the solid state battery in a fully or partially discharged state. The solid state battery can be coupled to a pair of electrodes, coupling a positive potential and a negative potential of the solid state battery. An energy source can be coupled to the electrodes to supply coupling and to supply energy to the solid state battery using a first constant current recharge process followed by a constant voltage recharge process (constant current constant voltage recharge process), or alternatively using a constant voltage recharge process. The supply of energy can cause an increase of an energy level of the solid state battery to the maximum energy level within a predetermined efficiency and a predetermined time period, the predetermined efficiency being greater than a value specified by the application of the battery. Through these process steps, a temperature of −20 Degrees Celsius to 160 Degrees Celsius during the recharging process.

In a specific embodiment, the constant current constant voltage recharge process can include recharging the solid state battery with a constant current until a voltage of the solid state battery reaches an upper voltage limit and recharging the solid state battery with a constant voltage with a voltage value maintained at the upper voltage limit until a time duration is reached or a state of charge is reached. The constant current value can be converted from a C rate of the solid state battery, the C rate being selected to minimize the time period. Also, the upper voltage limit is selected to a maximum open circuit potential of a cathode material against an anode material and a wide stable operational voltage region of a solid electrolyte material in the solid state battery cell, the upper voltage limit being selected to minimize the predetermined time and maximizing energy restored to the solid state battery. The predetermined time can be determined to achieve an amount of energy restored to the solid state battery, the amount of energy being substantially within a vicinity of a theoretical upper limit for the electrochemical cells which comprise the battery, of an operational voltage range from about 0.1 Volt to 5.5 Volts of the solid state battery using a solid electrolyte. In a specific embodiment, the solid state battery is provided for one or more applications including at least consumer electronics (including smartphones, cameras, tablets and laptop computers), grid storage for wind energy, hybrid electrical vehicles, and others where recharge time is reduced while maximizing energy efficiency is not achieved.

In a specific embodiment, the constant voltage recharge process can include recharging the solid state battery with a constant voltage at a value and maintaining the constant voltage recharge process until a time duration is reached or a state of charge is reached. The constant voltage value can be selected according to an maximum open circuit potential of a cathode material against an anode material and a wide stable operational voltage range from about 0.1 Volts to 5.5 Volts in the solid state battery cell, constant voltage value being selected to minimize a recharge time and maximizing an energy restored to the solid state battery. In a specific embodiment, the solid state battery is provided in at least one application including a grid storage for solar energy, a grid storage for load balancing, an electric vehicle, an extended range battery electric vehicle, a plug-in hybrid electric vehicle, a heavy duty uninterruptible power supply, or other applications where energy efficiency is desirably maximized and shortening recharge time duration is not achieved. Of course, there can be other variations, modifications, and alternatives.

As stated previously, battery cell technology faces many challenges, such as cell inefficiency and imbalance. This can lead to limits in performance and lifetime. Recharging battery cells are often too time consuming and inefficient. The current art teaches the use of higher energy, higher voltage cells, determining state of charge cell by cell, and throttling voltage to reduce side reactions and improve cycle life, while only utilizing part of the cell capacity. The side reactions includes cathode dissolution and electrolyte decomposition.

Embodiments of the present invention can include the use methods and systems to make solid state cells lead by computation aided engineering and design. Issues such as off gassing, cathode dissolution, and electrolyte solvent/salt decomposition can be mitigated and even eliminated by selecting only solid state processing. Higher throughput of cells can be conducted through simulations, which extend design of solid state battery cells to novel areas. These can be used to determine improved and novel recharge protocols that maximize energy density and efficiency, while minimizing recharge time.

Figure 4:
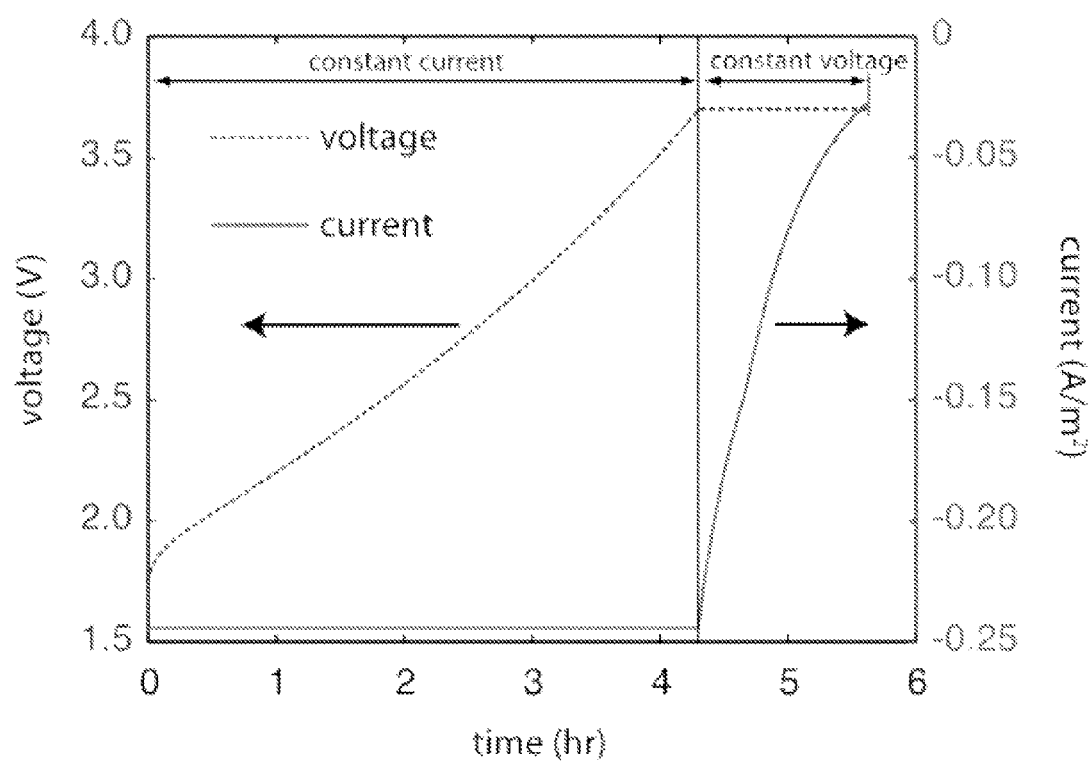
FIG. 4 is a simplified diagram of a computer-simulation of recharging a solid state battery according to an embodiment of the present invention.
Figure 5:
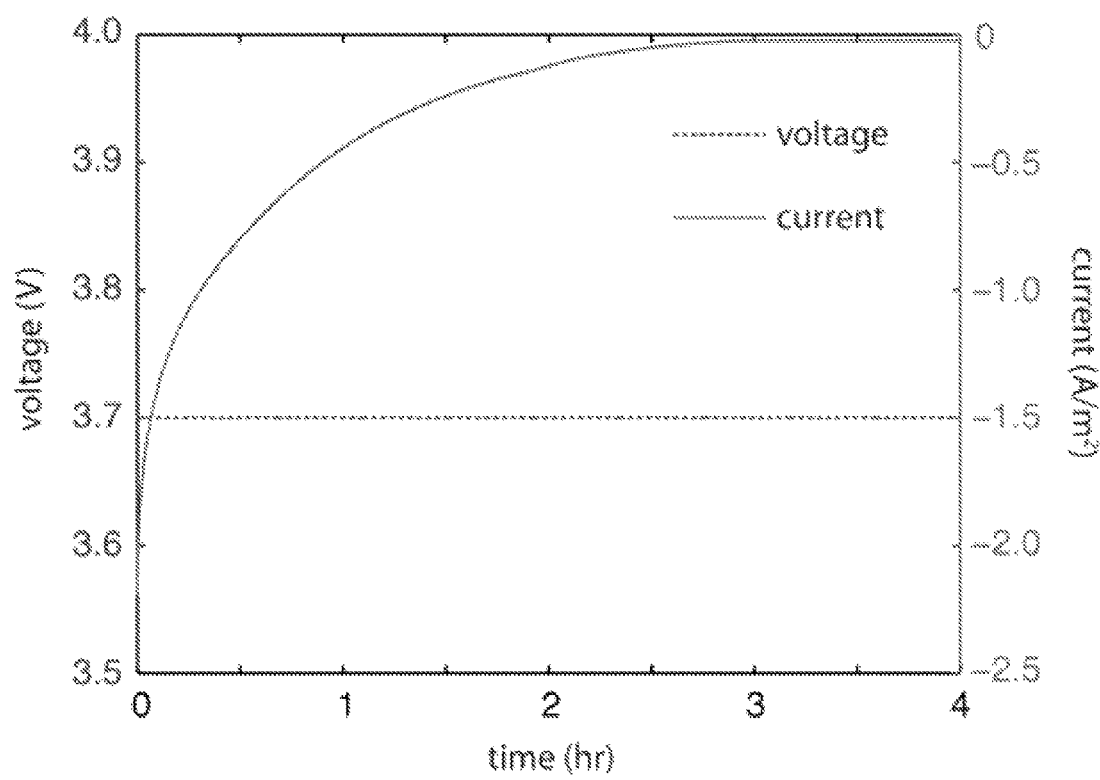
FIG. 5 is a simplified diagram of a computer-simulation of recharging a solid state battery according to an embodiment of the present invention.

FIGS. 4 and 5 are simplified diagrams of computer-simulations of recharging solid state batteries according to an embodiment of the present invention. This diagram is merely an illustration and should not unduly limit the scope of the claims herein.

Example 4

Comparison of the Energy Restored During Recharge and Energy Efficiency for Different Recharge Methods Generated by Computer Simulations Table 2 below shows that different recharge methods yields different energy restored during charge and different energy efficiency. There is a need to design the recharge method to achieve better energy efficiency and maximize energy restored.

TABLE 2

Comparison of the energy restored during recharge and energy efficiency for different recharge methods generated by computer simulations.

| Profile | 1 | 2 | 3 | 4 |
| --- | --- | --- | --- | --- |
| Discharge profile | C/10 constant current until 1.5 V | C/10 constant current until 1.5 V | C/10 constant current until 1.5 V | C/10 constant current until 1.5 V |
| Recharge profile | first C/10 constant current till 3.5 V, then hold at constant voltage of 3.5 V for 1 hour | first C/10 constant current till 3.7 V, then hold at constant voltage of 3.7 V for 1 hour | constant voltage at 3.5 V for 3 hours | constant voltage at 3.7 V for 3 hours |
| 1st discharge released energy | 1048 Wh/l | 1048 Wh/l | 1048 Wh/l | 1048 Wh/l |
| 1st recharge required energy | 1130 Wh/l | 1226 Wh/l | 1491 Wh/l | 1670 Wh/l |
| 1st recharge time | 8.63 hr | 9.23 hr | 3.0 hr | 3.0 hr |
| 2nd discharge released energy | 962 Wh/l | 1045 Wh/l | 964 Wh/l | 1046 Wh/l |
| Efficiency (2nd discharge energy over 1st recharge energy) | 85.1% | 85.2% | 64.7% | 62.6% |

Example 5

Comparison of Energy Restored Measured by Energy Released During Discharge for Different Recharge Methods Generated by Computer Simulations FIG. 6 is a table comparing charge data from computer simulations of recharging solid state batteries according to an embodiment of the present invention. This diagram is merely an illustration and should not unduly limit the scope of the claims herein. This diagram shows that recharge method needs to be carefully designed to restore the maximum energy. The discharge energy density for cycle #1 is the maximum achievable energy when the battery is fully charged. The discharge energy density for cycle #2 is the released energy during discharge after the battery is recharged using different recharge profiles. This discharge energy density (during cycle #2) is compared with the discharge energy density in cycle #1. This helps to evaluate the energy loss due to insufficient recharging. The difference is tremendous, 8.2% between profile 1 and profile 5. Embodiments of the present invention are commensurate with hundreds of millions of dollars in investments and R&D in battery companies worldwide, which have produced lesser improvements in energy density, in the aggregate. The methods in this invention are completely non-obvious—they only result with novel manufacturing, novel computing (Ser. Nos. 12/484,959, 12/484,966, 13/103,004, 13/103,008) and the new innovation, namely using optimization in conjunction with controls and multiphysics.

Example 6

Comparison of Total Recharge Time and Energy Efficiency Generated by Computer Simulations for Different C Rates Used in the Constant Current Recharge Phase During a Constant Current Constant Voltage Recharge Process The cells are charged using constant current constant voltage recharge. Constant current uses different values as shown in the first column of the table. Constant voltage is 3.7 V. The constant voltage is held until 99% of the capacity is restored.

Total recharge time includes the time spent on both constant current phase and constant voltage phase.

The energy efficiency is defined as the ratio between the true stored energy and the energy consumed during recharge.

Table 3 shows that there is a trade-off between recharge time and energy efficiency. The design of the recharge method depends a lot on the application of batteries. If the application prefers shorter recharge time to better energy efficiency, a higher rate for the constant current recharge phase should be used. If the application prefers better energy efficiency to shorter recharge time, a lower rate for the constant current recharge phase should be used.

TABLE 3

Comparison of total recharge time and energy efficiency generated by computer simulations for different C rates used in the constant current recharge phase during a constant current constant voltage recharge process

| C rate for constant current recharge phase | Total recharge time (hr) | Energy efficiency |
|---|---|---|
| 0.1 | 10.13 | 91.9% |
| 0.2 | 5.30 | 85.7% |
| 0.3 | 3.61 | 80.5% |
| 0.4 | 2.76 | 76.4% |
| 0.6 | 1.90 | 69.3% |
| 0.8 | 1.46 | 64.2% |
| 1.0 | 1.21 | 60.8% |
| 1.5 | 1.02 | 57.8% |

Example 7

An Example of Showing how to Maintain Constant Current and Constant Voltage for a Given Charging Power Source Here an example is explained merely by way of example. The constant current during recharging is maintained by detecting an output current applied to the battery using a resistor; amplifying a voltage drop at the resistor as much as the voltage gain at the resistor using a comparator; and supplying an amplified voltage with the feedback input terminal of the voltage regulator.

The constant voltage during recharging is maintained by detecting a charging voltage of the battery using a voltage divider; providing a reference voltage using a reference voltage generator; producing a mode converting signal using a comparator when a divided voltage from the voltage divider is higher than the reference voltage; and providing the charging voltage with the feedback input terminal of the voltage regulator using a transistor in response to the mode converting signal.

Example 8

A Diagram of a Charging System for a Solid State Battery

Figure 7:
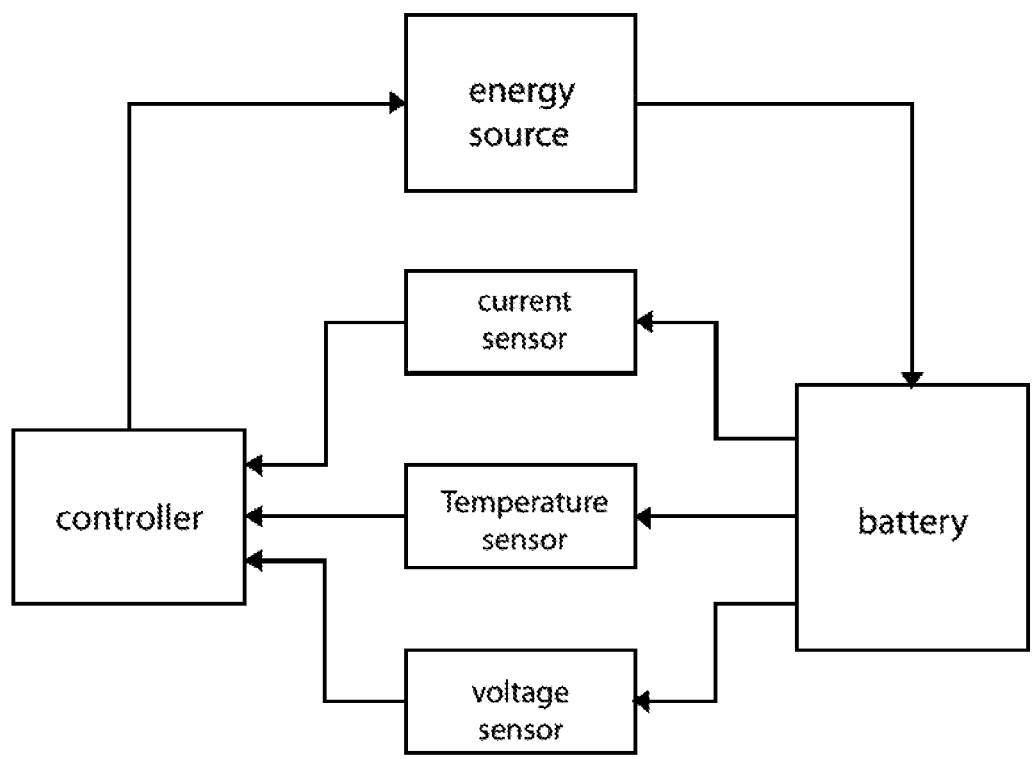
FIG. 7 is a simplified diagram of a solid state battery charging system according to an embodiment of the present invention.

FIG. 7 is a simplified diagram of a solid state battery charging system according to an embodiment of the present invention. This diagram is merely an illustration and should not unduly limit the scope of the claims herein. As shown, the charging system can include a solid state battery device, a voltage sensor, a current sensor, a temperature sensor, an energy source, and a controller. Each of the sensors can have two or more probes. The energy source can be configured to apply a constant charging current and/or a constant charging voltage to the battery.

In a specific embodiment, the solid state battery device can be characterized by a theoretical energy capacity with an operating temperature range from about −20 to about 160 Degrees Celsius, and an operating voltage range from about 0.1 Volt to about 5.5 Volts for a solid state electrochemical battery cell. The solid state battery device can be a battery cell, a battery module consisting of a plurality of battery cells, or a battery pack consisting of a plurality of battery modules. Those of ordinary skill in the art will recognize other variations, modifications, and alternatives.

In a specific embodiment, the controller can include one or more computer codes in a computer readable memory device or devices. These computer codes can be directed to the transmission of instructions to the energy source to turn of the energy source when a state of charge of the solid state battery is within a vicinity of the theoretical energy capacity. The controller can also be configured to receive one or more inputs from the voltage sensor, the current sensor, and the temperature sensor, and be configured to transmit a control signal to the energy source.

In various embodiments, the controller can be configured to direct the charging source to apply a constant charging current to the battery until the monitored voltage reaches an upper limit and/or direct the charging source to apply a constant charging voltage to the battery until the state of charge of the solid state battery reaches a determined value. The controller can be further configured to switch a charging mode of the energy source from a constant current process to a constant voltage process, and vice versa. Also, the controller can be further configured to determine a state of charge of the solid state battery by using at least the inputs comprising the measured voltage from the voltage sensor and the measured current from the current sensor; and the controller is programmed to execute one or more lines of computer code stored on a computer readable memory, the computer codes are directed to one or more processes including at least: coulomb counting, voltage translation, and voltage look-up, and/or other processes comprising at least: fuzzy logic, neural networks, extended Kalman filter, unscented transform based correction-prediction filter, and other recursive self-learning estimation methods, associated with battery models comprising at least equivalent circuit models multiphysics model, and other reduced-order models. Of course, there can be other variations, modifications, and alternatives.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method of recharging solid state battery cells, the solid state battery cells characterized by a maximum energy level, the maximum energy level being an upper energy limit of the solid state battery, the method comprising:
    providing the solid state battery in a fully or partially discharged state;
    coupling the solid state battery to a pair of electrodes coupling a positive potential and a negative potential of the solid state battery;
    using an energy source coupled to the electrodes to supply energy to the solid state battery using a first constant current recharge process followed by a constant voltage recharge process (constant current constant voltage recharge process) or alternatively using a constant voltage recharge process;
    causing an increase of an energy level of the solid state battery to the maximum energy level within a predetermined amount of time, the predetermined amount of time being less than a time period associated with recharging the solid state battery using solely a constant current recharge process; and
    maintaining a temperature of the solid state battery from about −20 Degrees Celsius to 160 Degrees Celsius during the recharging process.

2. The method of claim h wherein the constant current constant voltage recharge process comprises:
    recharging the solid state battery with a constant current until a voltage of the solid state battery reaches an upper voltage limit; and
    recharging the solid state battery with a constant voltage with a voltage value maintained at the upper voltage limit until a time duration is reached or a state of charge is reached.

3. The method of claim 2, wherein the constant current value is converted from a C rate of the solid state battery, the C rate being selected to minimize the time period.

4. The method of claim 2, wherein the upper voltage limit is selected to a maximum open circuit potential of a cathode material against an anode material and a wide stable operational voltage region of a solid electrolyte material in the solid state battery cell, the upper voltage limit being selected to minimize the predetermined time and maximizing energy restored to the solid state battery.

5. The method of claim 2, wherein the predetermined time is determined to achieve an amount of energy restored to the solid state battery, the amount of energy being substantially within a vicinity of a theoretical upper limit for the electrochemical cells which comprise the battery, of an operational voltage range from about 0.1 Volt to 5.5 Volts of the solid state battery using a solid electrolyte.

6. The method of claim 2, wherein the solid state battery is provided for one or more applications including at least consumer electronics (including smartphones, cameras, tablets and laptop computers), grid storage for wind energy, hybrid electrical vehicles, and others where recharge time is reduced while maximizing energy efficiency is not achieved.

7. The method of claim h wherein the constant voltage recharge process comprises:
    recharging the solid state battery with a constant voltage at a value; and
    maintaining the constant voltage recharge process until a time duration is reached or a state of charge is reached.

8. The method of claim 7, wherein the constant voltage value is selected according to an maximum open circuit potential of a cathode material against an anode material and a wide stable operational voltage range from about 0.1 Volts to 5.5 Volts in the solid state battery cell, constant voltage value being selected to minimize a recharge time and maximizing an energy restored to the solid state battery.

9. A method of recharging solid state battery cells, the solid state battery characterized by a maximum energy level, the maximum energy level being an upper energy limit of the solid state battery, the method comprising:
    providing the solid state battery in a fully or partially discharged state;
    coupling the solid state battery to a pair of electrodes coupling a positive potential and a negative potential of the solid state battery;
    using an energy source coupled to the electrodes to supply coupling;
    using an energy source coupled to the electrodes to supply energy to the solid state battery using a first constant current recharge process followed by a constant voltage recharge process (constant current constant voltage recharge process), or alternatively using a constant voltage recharge process;
    causing an increase of an energy level of the solid state battery to the maximum energy level within a predetermined efficiency and a predetermined time period, the predetermined efficiency being greater than an efficiency specified for the application of the battery, wherein the predetermined efficiency is a predetermined ratio of an energy stored in the battery and an energy consumed during recharge, and the efficiency specified by the application is a specified ratio of an energy stored in the battery and an energy consumed during recharge for a particular application; and
    maintaining a temperature of the solid state battery from about −20 Degrees Celsius to 160 Degrees Celsius during the recharging process.

10. The method of claim 9, wherein the constant current constant voltage recharge process comprises:
    recharging the solid state battery with a constant current until a voltage of the solid state battery reaches an upper voltage limit; and
    recharging the solid state battery with a constant voltage at a voltage value maintained at the upper voltage limit until the predetermined time range is reached or a state of charge is reached.

11. The method of claim 10, wherein the constant current value is converted from a C rate for the solid state battery, the C rate being selected to maximize the energy efficiency.

12. The method of claim 10, wherein the upper voltage limit is selected according to a maximum open circuit potential of a cathode material against an anode material and a wide stable operational voltage range from about 0.1 Volt to 5.5 Volts of a solid electrolyte material in the solid state battery cell, the voltage limit being selected to maximizing the energy efficiency and maximizing an energy restored.

13. The method of claim 10, wherein the predetermined time range is determined to achieve an amount of energy restored the amount of energy being substantially within a vicinity of a theoretical upper limit for the electrochemical cells which comprise the battery, of an operational voltage range from about 0.1 Volt to 5.5 Volts of the solid state battery using a solid electrolyte.

14. The method of claim 9, wherein the constant voltage recharge process comprises:
   recharging the solid state battery with a constant voltage at a value; and
   maintaining the constant voltage recharge process until the predetermined time range is reached or a state of charge is reached.

15. The method of claim 14, wherein the constant voltage value is selected according to a maximum open circuit potential of a cathode material against an anode material and an operational voltage range of 0.1 Volt to 5.5 Volts, the voltage range being selected to maximize the energy efficiency and maximize an energy restored.

16. The method of claim 9, wherein the solid state battery is provided in at least one application including a grid storage for solar energy, a grid storage for load balancing, an electric vehicle, an extended range battery electric vehicle, a plug-in hybrid electric vehicle, a heavy duty uninterruptible power supply, or other applications where energy efficiency is desirably maximized and shortening recharge time duration is not achieved.

* * * * *